US00RE49778E

(19) United States
(12) Reissued Patent
Jones

(10) Patent Number: US RE49,778 E
(45) Date of Reissued Patent: Jan. 2, 2024

(54) PERSISTENT VORTEX GENERATING HIGH REGRESSION RATE SOLID FUEL GRAIN FOR A HYBRID ROCKET ENGINE

(71) Applicant: Firehawk Aerospace, Inc., Carrollton, TX (US)

(72) Inventor: Ronald D. Jones, Melbourne, FL (US)

(73) Assignee: Firehawk Aerospace, Inc., Carrollton, TX (US)

(21) Appl. No.: 17/338,276

(22) Filed: Jun. 3, 2021

Related U.S. Patent Documents

Reissue of:

(64) Patent No.: 10,309,346
Issued: Jun. 4, 2019
Appl. No.: 15/867,852
Filed: Jan. 11, 2018

U.S. Applications:

(63) Continuation-in-part of application No. 15/262,661, filed on Sep. 12, 2016, now Pat. No. 9,890,091, which (Continued)

(51) Int. Cl.
*F02K 9/72* (2006.01)
*F02K 9/18* (2006.01)

(Continued)

(52) U.S. Cl.
CPC ..... *F02K 9/72* (2013.01); *B64G 1/403* (2013.01); *B64G 1/404* (2013.01); *F02K 9/10* (2013.01);

(Continued)

(58) Field of Classification Search
CPC ..... F02K 9/10; F02K 9/18; F02K 9/72; B64G 1/403; B64G 1/404; C06D 5/10;

(Continued)

(56) References Cited

U.S. PATENT DOCUMENTS 3,002,459 A 10/1961 Harper
3,022,735 A 2/1962 Eberle (Continued)

FOREIGN PATENT DOCUMENTS

JP 1994-200266 A 7/1994

OTHER PUBLICATIONS

Elliott et al., ""Additive Manufacturing of Small Scale Rocket Grain Cartridges with Uniformly Distributed Aluminum Particles,"" AIAA Propulsion and Energy Forum, Jul. 2016, 7 pages.

(Continued)

*Primary Examiner* — Joseph A Kaufman
(74) *Attorney, Agent, or Firm* — Fish & Richardson P.C.

(57) ABSTRACT

A cylindrically-shaped hybrid rocket engine solid fuel grain defines an axial combustion port. A fuel grain material comprises a compounded blend of thermoplastic fuel and aluminum. The fuel grain comprises fused stack layers, each layer comprising a plurality of fused abutting concentric beaded structures arrayed to define the combustion port; the port exhibits a rifling pattern or rifling inducing geometry along the port wall. When an oxidizer is introduced into the combustion port combustion occurs along the exposed port wall. Each beaded structure defines a geometry that increases the combustion surface area while inducing a vortex flow of oxidizer and fuel gas. As each layer ablates, an abutting layer exhibiting a similar geometry, is revealed, undergoes a gas phase change, and ablates. This process repeats and persists until oxidizer flow is terminated or the (Continued)

fuel grain material is exhausted. The fuel grain may be manufactured by an additive manufacturing process.

50 Claims, 10 Drawing Sheets

Related U.S. Application Data is a continuation-in-part of application No. 12/052,934, filed on Mar. 21, 2008, now Pat. No. 9,453,479.

(60) Provisional application No. 60/896,296, filed on Mar. 22, 2007.

(51) Int. Cl.

| | |
|---|---|
| ***F02K 9/10*** | (2006.01) |
| ***B64G 1/40*** | (2006.01) |
| *C06B 45/10* | (2006.01) |
| *C06B 45/32* | (2006.01) |
| *B33Y 80/00* | (2015.01) |
| *C06B 45/12* | (2006.01) |
| *C06D 5/10* | (2006.01) |

(52) U.S. Cl.
CPC ..... *F02K 9/18* (2013.01); *B33Y 80/00* (2014.12); *C06B 45/10* (2013.01); *C06B 45/12* (2013.01); *C06B 45/32* (2013.01); *C06D 5/10* (2013.01); *F05D 2240/127* (2013.01); *F05D 2250/60* (2013.01); *F05D 2250/61* (2013.01)

(58) Field of Classification Search
CPC ..... C06B 45/10; C06B 45/12; C06B 45/32; B33Y 80/00; F05D 2240/127; F05D 2250/60; F05D 2250/61
See application file for complete search history.

(56) References Cited

U.S. PATENT DOCUMENTS

| | | | | |
|---|---|---|---|---|
| 3,120,737 | A | 2/1964 | Holloway | |
| 3,143,446 | A * | 8/1964 | Berman | C06B 45/00 149/109.2 |
| 3,226,928 | A | 1/1966 | Jackson | |
| 3,274,771 | A | 9/1966 | Lieberman et al. | |
| 3,316,718 | A | 5/1967 | Webb | |
| 3,348,445 | A | 10/1967 | Nadel | |
| 3,555,825 | A | 1/1971 | Dilchert | |
| 3,613,597 | A | 10/1971 | Warren et al. | |
| 3,646,597 | A | 2/1972 | Feemster | |
| 3,677,010 | A * | 7/1972 | Fink | F02K 9/14 102/288 |
| 3,918,365 | A | 11/1975 | Arribat | |
| 4,357,795 | A | 11/1982 | Bastian et al. | |
| 4,729,317 | A | 3/1988 | Burdette et al. | |
| 5,062,365 | A | 11/1991 | Canterberry | |
| 5,127,223 | A | 7/1992 | Hightower, Jr. et al. | |
| 5,367,872 | A | 11/1994 | Lund | |
| 5,386,777 | A | 2/1995 | Lou et al. | |
| 5,529,648 | A | 6/1996 | Stickler | |
| 5,694,769 | A | 12/1997 | Akiba et al. | |
| 5,714,711 | A | 2/1998 | Schumacher et al. | |
| 5,715,675 | A | 2/1998 | Lou | |
| 5,721,392 | A | 2/1998 | Chan | |
| 6,016,652 | A | 1/2000 | Smith | |
| 6,022,207 | A | 2/2000 | Dahlin | |
| 6,058,697 | A | 5/2000 | Smith et al. | |
| 6,125,763 | A * | 10/2000 | Kline | C06D 5/00 102/202.7 |
| 6,630,093 | B1 | 10/2003 | Jones | |
| 6,796,171 | B2 | 9/2004 | Heisler | |
| 6,880,326 | B2 | 4/2005 | Karabeyoglu et al. | |
| 7,022,196 | B2 | 4/2006 | Cesaroni et al. | |
| 7,777,155 | B2 | 8/2010 | Twelves | |
| 8,387,361 | B2 | 3/2013 | Ho | |
| 9,453,479 | B1 | 9/2016 | Jones | |
| 9,822,045 | B2 | 11/2017 | Jones | |
| 9,890,091 | B2 | 2/2018 | Jones | |
| 10,286,599 | B2 | 5/2019 | Jones | |
| 10,309,346 | B2 | 6/2019 | Jones | |
| 2005/0225007 | A1 | 10/2005 | Lai | |
| 2009/0314391 | A1 | 12/2009 | Crump | |
| 2010/0176247 | A1 | 7/2010 | Kibens et al. | |
| 2011/0137578 | A1 | 6/2011 | Dietrich et al. | |
| 2012/0009424 | A1 | 1/2012 | Jelliss | |
| 2013/0042951 | A1 * | 2/2013 | Fuller | B29C 33/3857 149/14 |
| 2016/0136897 | A1 | 5/2016 | Nielsen-Cole et al. | |
| 2016/0355447 | A1 | 12/2016 | Danforth et al. | |
| 2018/0169937 | A1 | 6/2018 | Jones | |
| 2021/0387403 | A1 | 12/2021 | Rolland | |
| 2021/0402062 | A1 | 12/2021 | Chatzistavrou et al. | |

OTHER PUBLICATIONS

Pham et al., "A comparison of rapid prototyping technologies," International Journal of Machine Tools & Manufacture, Oct. 1998, 38(10-11):1257-1287.

Zilliac et al., "Hybrid Rocket Fuel Regression Rate Data and Modeling," 42nd AIAA/ASME/SAE/ASEE Joint Propulsion Conference & Exhibit Jul. 9-12, 2006, 21 pages.

* cited by examiner

PERSISTENT VORTEX GENERATING HIGH REGRESSION RATE SOLID FUEL GRAIN FOR A HYBRID ROCKET ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *reissue application of U.S. Pat. No. 10,309,346* (*filed as U.S. patent application Ser. No. 15/867,852 on Jan. 11, 2018*), *which is a* continuation-in-part application of U.S. patent application Ser. No. 15/262,661, filed on Sep. 12, 2016, entitled Persistent Vortex Generating High Regression Rate Solid Fuel Grain for a Hybrid Rocket Engine and Method for Manufacturing Same, now issued U.S. Pat. No. 9,890,091, which is a continuation-in-part application of U.S. patent application Ser. No. 12/052,934 filed on Mar. 21, 2008 entitled Solid Fuel Grain for a Hybrid Propulsion System of a Rocket and Method for Manufacturing Same, now issued U.S. Pat. No. 9,453,479, which claims priority to the provisional patent application No. 60/896,296 filed on Mar. 27, 2007 of the same title. The entire disclosure of each of these documents is incorporated herein by reference.

FIELD OF THE INVENTION

The present invention relates to a solid fuel grain for a hybrid rocket engine having a fuel grain port featuring a wall surface pattern or geometric shape that induces a vortex flow of atomized liquid or gaseous oxidizer as it is urged through the fuel grain port, which dually serves as the rocket engine's combustion chamber, and via an ablation process, the engine's fuel source. Unlike prior art examples, which upon ignition quickly ablate and dissipate, the present invention's vortex-inducing port wall surface pattern or geometric shape persists as fuel is ablated; thus, providing more thorough oxidizer/fuel mixing and combustion throughout the rocket engine's operation.

BACKGROUND OF THE INVENTION

The present invention relates generally to rocket propulsion systems and specifically to hybrid rocket engines. There are three basic types of chemical rockets in use today: liquid rocket engines that use liquid propellants (also referred to as either liquid monopropellant or liquid bi-propellent engines), solid rocket motors that use solid propellants, and hybrid rocket engines that use a combination of liquid and solid propellants.

In a conventionally designed hybrid rocket engine, the fuel is stored in the solid state, while the oxidizer is stored in either a liquid or gaseous state. Traditionally in most hybrid rocket engine designs, the solid fuel is cast-molded, extruded, or in some instances machined into a cylindrically shaped structure referred to as a fuel grain. The fuel grain is designed and formed to feature one or more internal passages running through its length. These passages are referred to as ports. The fuel grain port or ports dually serve as the hybrid rocket engine's combustion chamber or chambers, and through a gas phase change and ablation process, the fuel source.

The fuel grain is conventionally housed within a metal or fiber-reinforced polymer composite motor case designed to withstand the pressures and elevated temperatures created during the combustion process. The motor case may also feature an internal liner made from a high-temperature material to create a thermal barrier to prevent damage or burn-through during rocket engine operation.

The motor case, with fuel grain installed, is attached to a forward cap typically machined or cast from high-temperature metal alloys. The forward cap forms at least a portion of the pre-combustion chamber and houses the oxidizer injector and ignition system. The aft end of the motor case is attached to an assembly that forms at least a portion of the post combustion chamber and allows secure attachment to the rocket nozzle. The assembled motor case with fuel grain installed, forward cap, and aft assembly with attached nozzle is conventionally referred to as the motor or solid section of the hybrid rocket engine.

In a conventionally designed hybrid rocket engine, liquid or gaseous oxidizer is stored separately in an integrally formed pressure vessel or tank forward of the motor section within the rocket powered vehicle. However, in some designs, liquid or gaseous oxidizer may be stored adjacent to the motor section or even remotely on the vehicle. Conventionally, the tank or pressure vessel stored liquid or gaseous oxidizer is urged through a specially designed plumbing system, typically including a flow control valve to feed oxidizer through one or more oxidizer injectors housed within the motor section forward cap; and in turn, through the fuel grain port or ports.

The motive force needed to urge the liquid or gaseous oxidizer through the oxidizer injector or injectors into the fuel grain port or ports with sufficient flow rate to support combustion may be generated by any one of several techniques such as the use of a self-pressurizing liquifying gas, enabling an oxygen rich liquid to gas phase change using a catalyst to cause an exothermic reaction, employing a mechanical boost pump, pre-pressurizing the oxidizer tank with an externally supplied inert gas, or using an on-vehicle high pressure tank filled with an inert gas to boost oxidizer tank pressure.

Regardless of the configuration or type of liquid or gaseous oxidizer used, the assembly of oxidizer tank, pressurizing system and associated plumbing is typically referred to as the oxidizer section. Collectively, the motor section and the oxidizer section are referred to as a hybrid rocket engine, sometimes also referred to as a hybrid rocket motor.

Hybrid rocket engines offer certain advantages over both solid rocket motors and liquid rocket engines alike. For example, once ignited, a solid rocket motor cannot be stopped until its propellant is exhausted, and it cannot be throttled or restarted. Hybrid rocket engines, like liquid rocket engines, can be designed for on-command thrust termination, throttling, and engine restart. Most liquid monopropellant rocket engines use highly toxic, environmentally damaging propellants that are now considered too dangerous and to environmentally unsafe for continued use.

Compared to most liquid bi-propellant rocket engines, hybrid rocket engines are significantly less mechanically complex, and therefore more reliable and less expensive to develop, manufacture, and operate. Hybrid rockets are ideally suited to use propellants that are self-pressurizing, non-toxic, environmentally benign, operate at ambient temperatures, and require no specialized equipment for handling, transporting, and loading. Furthermore, hybrid rocket engines, due to the storage of their propellants in different states of matter, are inherently immune to explosion. Immunity to explosion is of great importance to rocket-powered vehicle designers and operators. Their superior safety, mechanical simplicity compared to liquid bi-propellant rocket engines, and environmental friendliness all translate to improved reliability as well as lower development, manufacturing, and operating costs.

Despite all of their aforementioned advantages, conventionally designed hybrid rocket engines using cast-molded solid fuels like hydroxyl-terminated polybutadiene (HTPB), a form of synthetic rubber that has been the most studied hybrid rocket engine fuel to date, are rarely if ever employed for applications requiring vibration free, consistent high performance. Unfortunately, conventionally designed hybrid rocket engines using cast-molded HTPB as well as other cast-molded solid fuels, including paraffin wax, polyamides, and thermoplastics, have not been able to demonstrate the vibration free, consistent, high performance required for most rocket propulsion applications.

Excessive vibration and inconsistent performance is even more pronounced when higher energetic additives such as aluminum powder have been blended into solid fuels like HTPB and paraffin wax. All of these disadvantages and inefficiencies are attributable to either the solid fuel material selected or to the fuel grain production methods. To fully understand the efficacy and advantages of the present invention, it is important to understand these disadvantages in relation to competing rocket propulsion systems as well as their respective causes.

Comparatively poor hybrid rocket engine performance and their often unpredictable, even sometimes dangerous nature can be attributed to: 1) low regression rate, i.e., the rate at which the solid fuel is consumed compared to solid rocket motors, 2) the build-up of adverse harmonics inducing unacceptable, sometimes dangerous levels of vibration, 3) excessive solid fuel waste compared to other rocket propulsion systems, 4) low specific impulse (Isp) compared to most liquid bi-propellant rocket engines, and 5) inconsistent, unpredictable thrust performance that renders them unusable in clustered (multiple engines per launch vehicle stage or spacecraft) configurations.

1). Low Regression Rate. For a given selection of fuels and oxidizer-to-fuel mass ratios, the thrust generated by a rocket or any type of reaction engine is approximately proportional to the mass flow rate. In a hybrid rocket engine, mass flow rate is proportional to fuel grain regression rate. In a classically designed hybrid rocket engine, particularly those using slow burning fuels like HTPB, the burning rate is further limited by the heat transfer from the relatively remote flame to the fuel grain port surface. One of the physical phenomena that limits the burning rate is the blocking effect caused by the injection of vaporizing fuel into the high-velocity oxidizer gas stream. Given the linear nature of the oxidizer gas stream, oxidizer/fuel vapor mixing and resulting combustion efficiency is a function of the amount of time available for mixing to occur within a classically designed hybrid rocket fuel grain port.

Attempts to increase the burning rate by mixing energetic materials like Alcoa produced Military Grade 44 aluminum powder (Rockledge, Tex.) (average particle size of 44 microns) with traditional hybrid rocket fuels using cast-molding production methods have been only marginally successful in improving rocket engine performance. Aluminum powder is highly reactive with oxygen and water. To passivate the material to be stable in atmospheric conditions for safe handling, processing, storing, transporting, and use in a rocket engine, the aluminum particle is allowed to form an outer layer of aluminum oxide (alumina), a non-combustible material that when burned acts as a heat sink causing a loss of temperature and energy within the center port. Factoring in an allowance for an appropriately sized oxidizer tank and associated plumbing in tandem with a long-thin fuel grain, hybrid rocket engines are considered ungainly and not a viable option for many applications.

Nano-scale aluminum powder is thought to be the next big advancement in both solid and hybrid rocketry. Elemental aluminum in nano-scale is significantly higher in reactivity than micron-scale powder due to its relatively high specific surface area. Unfortunately, most attempts to safely and efficaciously employ this material in both solid and hybrid rocketry have not been successful. If allowed to form an alumina shell, effectively consuming a portion of the aluminum core, much of the elemental aluminum's energetic value is lost.

In addition to the challenges associated with obtaining a uniform blend of polymer and metal powder throughout the fuel grain using the cast-molding technique, improved burning rates by use of metal additives such as aluminum have only served to exacerbate the problems associated with using relatively elastic materials such as HTPB and paraffin waxes as a primary hybrid rocket solid fuel. Moreover, attempts to improve the regression rate further using high energetic material such as ALEX powder (an ultra-fine aluminum powder produced by the plasma-explosion process) have been even less successful and have introduced a significant potential for spontaneous ignition or explosion stemming from the pyrophoric nature of these ultra-fine powders.

Despite the potential for significant increase in burning rate, on the order of 30% higher than standard Military grade 44 micron particle size aluminum powder, employing a material that will spontaneously ignite upon exposure to the atmosphere or explode on contact with water or water vapor is counter-productive to one of the most significant advantages of a hybrid rocket engine—its comparative higher safety (i.e., benign failure mode and U.S. Government recognized zero TNT equivalency) compared to other forms of chemical rocketry.

More recent efforts have involved the development of methods to stabilize the nano-scale aluminum particles by encapsulating each particle in a polymeric material; thereby, protecting the elemental aluminum from the environment. Some of these approaches, such as immersion in benzene followed by compounding with styrene to form granules of aluminum-styrene, have merit and warrant further investigation. Another developed technique involves a process in which the elemental aluminum particle, measuring 15 nm or less, is produced in a reactor simultaneously with the formation of a crystalline polymer outer shell. This passivated material is safe to handle, transport, store, and use as rocket propellant, and the particle core remains 99.9% pure elemental aluminum.

This difference in the combustion scheme of a hybrid rocket engine significantly degrades the propellant burning rate compared to a solid rocket motor propellant in which the solid-state oxidizer and fuel are in intimate contact. Consequently, the regression rate, using conventionally molded fuel grain materials like HTPB is typically one-tenth or less than that of most solid rocket propellants.

Structurally soft, HTPB with a Young's Modulus varying between 0.0026 GPa and 0.00756 GPa is a common polymeric binder used in solid rocketry. It has been the fuel of choice for over fifty years in many U.S. Government sponsored hybrid rocket propulsion research projects. Most of this work has involved integrating multi-port configurations into the fuel grain's design to increase the total fuel grain port surface area as a means to improve regression rate. Unfortunately, improvements in regression rate using multiport designs have been offset by reduced fuel volume loading, the build-up of adverse harmonics that induce excessive and sometimes dangerous levels of vibration, unpredictable thrust performance, and increased fuel waster. However, excessive vibration, unpredictable thrust performance, and increased fuel waste have also been observed in single port large hybrid rocket engine designs using both HTPB as well as faster burning, also structurally soft, paraffin wax with a Young's Modulus of 0.061 GPa. While it is generally understood that regression rate in a hybrid rocket engine is a function of fuel burn rate and port surface area, the increased regression rates achieved using multiport grain configurations have been more than offset by reduced reliability, consistency, efficiency, and safety.

2). Adverse Harmonics and Excessive Vibration. In any discussion about vibration in a hybrid rocket engine, it is important to keep in mind that the port within a hybrid rocket fuel grain is the engine's combustion chamber. Combustion chamber wall integrity is an essential design criterion in any reaction engine. Therefore, it is understandable that if a combustion chamber wall's structural integrity is degraded or compromised, chamber performance and reliability would likewise be degraded or compromised. Logically, an engineer would be reluctant to use a compressible, easily fractured material to fabricate a combustion chamber. But, this is exactly the case when soft, compressible, and fracture prone materials like HTPB and paraffin wax are used to construct a hybrid rocket fuel grain and its combustion chamber port or ports. To make matters more complex, given the fuel grain is also the rocket engine's fuel supply, as fuel is consumed, the port wall continually ablates and expands in diameter; thereby, increasing available surface area causing an oxidizer-fuel mixture shift from oxidizer rich to fuel rich combination. According to the prior art, this situation is addressed by throttling the oxidizer flow.

Materials such as HTPB and paraffin wax are thought to respond to high pressure gases created within the port by compressing the solid fuel against the higher-strength motor case; thereby, inducing grain fractures and erosive burning both common occurrences in large scale HTPB and paraffin wax hybrid rocket engines.

Adverse harmonics exhibited in hybrid rocket engines, particularly pronounced in large-scale variants, is thought to be caused by a compressive-relaxation response by these soft fuels reacting to elevated chamber pressures, creating a type of trampoline effect. These oscillations can build to dangerous vibration levels and even cause a catastrophic over pressurization event. Cast-molded fuel grains made from these materials are also prone to structural flaws such as weak spots, air bubbles, hot spots, and fractures that are also known to cause erosive burning and erratic, unpredictable performance. Fuel fragments breaking free and blocking or temporarily blocking the rocket's nozzle have also been recorded. These phenomena are considered even more problematic in large hybrid rocket engines, especially those using multi-port designs.

3). Excessive Solid Fuel Waste. A certain amount of residual solid fuel is expected in a hybrid rocket engine. However, in a multi-port configuration, the amount of non-combusted fuel that is expelled can be significant and in certain circumstances a safety concern. In multi-port designs, as the burn progresses and as fuel is ablated and combusted, the structure between the ports ultimately losses its integrity until failure occurs. In these situations, chunks of non-combusted fuel and webbing material have been known to break free, partially and sometimes completely blocking the nozzle, which can cause a serious safety problem. In multi-port HTPB fueled hybrid rocket engine designs, the total amount of residual and unspent fuel can reach 15% or more.

4). Poor Specific Impulse. Expressed in seconds, specific impulse (usually abbreviated Isp) is a measure of the efficiency of rocket and jet engines. By definition, it is the total impulse (or change in momentum) delivered per unit of propellant consumed and is dimensionally equivalent to the generated thrust divided by the propellant flow rate. Typically referenced as performance in vacuum for rockets, Isp is a convenient metric for comparing the efficiency of different rocket engines for launch vehicles and spacecraft.

Generally speaking, there is an inverse relationship between increased regression rate and Isp in a hybrid rocket. Whereas, regression rate speaks to the hybrid rocket engine's volumetric efficiency and thrust output as a function of fuel grain diameter, Isp relates more to the rocket engine's propellant efficiency. Ideally, rocket engine designers attempt to improve both. However, attempts to improve hybrid rocket Isp has mainly focused on evaluating and testing different propellant combinations. Whereas, a classical hybrid rocket engine uses a liquid or gaseous oxidizer and solid fuel, past experiments have been conducted on engine's that use a solid oxidizer and liquid fuels. While many of these achieved very high Isp—in the high 300 seconds (in a vacuum), they proved to be impractical for reasons primarily associated with the need to maintain a hydrocarbon fuel as a solid at cryogenic temperatures.

Other approaches have involved blending energetic materials such as aluminum powder into the fuel grain composition to increase Isp. However, obtaining a consistent, uniform mixture has always been a challenge using cast-molding techniques, especially when molding multi-port grains. Most conventionally designed hybrid rocket engines using nitrous oxide and polymeric fuel like HTPB average Isp is between 270 seconds to 290 seconds (vacuum), the higher figure attained with the addition of aluminum powder as an additive. While higher than most solid rocket motors, this level of performance is significantly lower than competing liquid bi-propellant systems using liquid oxygen and hydrocarbon fuels like kerosene that average between 310-340 seconds.

5). Inconsistent Thrust Performance. Inconsistent, unpredictable thrust in a classical hybrid rocket engine is a direct consequence of all of the above listed shortcomings and problems. Inconsistent and unpredictable performance makes it impossible for a hybrid rocket engine to be seriously considered for most rocket propulsion applications and uses. Further, many of the causes of inconsistent thrust performance can be tied to the cast-molding production process used to fabricate hybrid rocket fuel grains. HTPB and paraffin wax fuel grains are typically centrifugally cast-molded, with the latter containing a small percentage of polyethylene to improve tensile strength. During the HTPB polymerizing process, small air bubbles are formed and hot spots are created due to incomplete mixing and uneven curing. HTPB fuel grains require up to 90 days or more to fully cure, and even then, their material characteristics change over time. Small air bubbles are also formed during the cooling cycle when fuel grains are cast from paraffin wax. Bubble formation is a function of the shrinkage occurring within the wax. In an attempt to reduce or eliminate unwanted air bubbles as well as other types of grain flaws and hot spots, centrifugal casting methods, taking up to 120 hours to complete, are routinely employed. Even with these measures, air bubbles, structural cracks, hot spots, and other flaws seem to be chronic for fuel grains made using the cast-molding process.

Therefore, it would be highly desirable to develop a solid fuel propellant and fuel grain architecture-topology that exhibits: 1) flawless composition, 2) a regression rate approaching that of solid rocket motors, 3) significantly improved thrust consistency, 4) more thorough oxidizer-fuel mixing, 5) greatly improved specific impulse, and 6) minimal vibration—all without compromising the many safety, mechanical simplicity, and economic advantages inherent in hybrid rocket propulsion systems.

SUMMARY OF THE INVENTION

The present invention is a high performance, safe to produce, store, transport, and operate hybrid rocket solid fuel grain made from thermoplastic or a formulation of thermoplastic and high energetic metal additives such as aluminum powder.

In one embodiment, the fuel grain can be fabricated using a fused deposition type additive manufacturing method and apparatus. The details of such an additive fabrication apparatus and process can be found in the commonly-owned U.S. Pat. No. 9,453,479, entitled Solid Fuel Grain for a Hybrid Propulsion System of a Rocket and Method for Manufacturing Same, issued on Sep. 27, 2016; and the commonly-owned U.S. Pat. No. 9,822,045, entitled Additive Manufactured Thermoplastic-Nanocomposite Aluminum Hybrid Rocket Fuel Grain and Method of Manufacturing Same, issued on Nov. 21, 2017, and the commonly-owned pending patent application Ser. No. 15/818,381, entitled Additive Manufactured Thermoplastic-Nanocomposite Aluminum Hybrid Rocket Fuel Grain and Method of Manufacturing Same, filed on Nov. 20, 2017 . Each of these patent documents is incorporated herein in their entirety.

The invention comprises a solid fuel grain for a hybrid rocket engine having a cylindrical shape featuring a center combustion port, comprised as a stack of fused layers fabricated from a material suitable as a hybrid rocket fuel. Each layer is formed as a plurality of fused abutting concentric ring-shaped, polygonal or similarly shaped beads of solidified material of increasing radii arrayed around the center port.

An oxidizer is introduced into the solid fuel grain through the center port, with combustion occurring along the exposed surfaces of the solid fuel grain center port wall.

Each concentric ring-shaped bead of fuel grain material possesses an undulating or irregular circular geometry or irregular pattern, the plurality of which forms a surface pattern designed to increase the amount of surface area available for combustion, and when stacked and fused may also form a rifling pattern or geometry that induces oxidizer-fuel gas vortex flow to improve combustion efficiency.

The fuel grain employs an internal topology that both presents increased port wall surface area to the flame zone while inducing axial oxidizer-fuel gas flow in a manner that persists during the rocket engine's operation; and depending upon the solid fuel selected, either phase changes from solid to a gas or from solid to entrained droplets, and is subsequently ablated.

The solid fuel grain is preferably manufactured using any one of a variety of additive manufacturing machine technologies and techniques, including the techniques described and claimed in the commonly-owned application Ser. No. 15/818,381 and the issued U.S. Pat. Nos. 9,453,479 and 9,822,045, as referenced above.

After being loaded into a hybrid rocket engine's solid section, concurrent with ignition actuation to elevate the temperature within the center port above the solid fuel's ignition or glass transition temperature, a liquid or gaseous oxidizer is introduced into the solid fuel grain through one or multiple injectors along a pathway defined by the center port causing a thin layer of the center port wall to phase change.

Depending upon the type of solid fuel used, phase change will occur either from a solid to a gas or from a solid to entrained liquid droplets along the exposed surface area of the solid fuel grain port wall. The resulting gaseous or entrained liquid fuel then mixes with the oxidizer to form an oxidizer/fuel mixture suitable for hybrid rocket engine combustion. The resulting combusted reaction mass is expelled at high temperature and pressure through the rocket engine's nozzle (conventional de Laval or aerospike) at supersonic speed to generate thrust.

Each concentric solidified circular, polygonal, or similarly ring-shaped, bead of material possesses a geometry that is designed to expose more fuel surface along the center port wall for combustion than would otherwise be possible if the center port wall were of a smooth, uniform cast-molded design. Starting with the center port wall and working outward, each beaded concentric ring structure, after undergoing phase change and ablation, is replaced by the next abutting beaded concentric ring structure. This process is repeated and persists throughout the rocket engine's operation until either oxidizer flow is terminated or the solid fuel is exhausted Unlike prior art constructions that attempt to increase regression rate using cast-molded multi-port grain architecture featuring smooth port walls at the sacrifice of fuel loading, increased fuel waste, and induced excessive vibration, the solid fuel grain of the present invention, especially if additively manufactured, supports smooth, consistent rocket engine operation at regression rates previously unobtainable in a single port design. Further, by replacing cast-molding production methods with additive manufacturing methods, grain flaws chronic to both cast-molded fuel grains made from HTPB and paraffin wax are eliminated.

Another exemplary solid fuel grain suitable for use in a hybrid rocket engine and made in accordance with the present invention is formed as described herein, but with each concentric beaded ring structure possessing a pattern that both increases the surface area available for combustion and creates, in its plurality of fused stacked layers, a rifling type pattern or geometry within the port wall designed to induce oxidizer swirling flow around the center port axis line rather than laminar or streamline flow; thereby, creating a vortex within the center port to enable oxidizer and gaseous fuel to spend more time within the center port to mix and combust more thoroughly than would otherwise be possible.

Again, as in the above exemplary example, the pattern thus engineered into the fuel grain topology will persist throughout the rocket engine's operation until either oxidizer flow is terminated or the solid fuel is exhausted. Prior art constructions have employed swirling type oxidizer injectors to induce vortex flow. However, this prior art technique is only partially effective as it cannot generate axial flow throughout the length of the fuel grain and its center port.

In prior art embodiments, rifling patterns or rifling inducing geometries have been imprinted onto the molded fuel grain's port wall as a means to induce axial oxidizer-fuel gas flow. Unfortunately, any vortex generated in this manner is only momentary due to the surface pattern being quickly ablated and not repeated.

In contrast, the solid fuel grain of the present invention supports smooth, consistent rocket engine operation at regression rates previously unobtainable in a single port design while improving Isp by enabling more complete oxidizer-fuel mixing and combustion while significantly reducing the amount of wasted fuel. More thorough combustion and higher Isp enables hybrid rocket engine designers the opportunity to design hybrid rocket engines with reduced fuel grain aspect ratio as well as with lower oxidizer loading to meet dimensional restrictions and performance requirements for rocket propulsion applications that previously could not consider a hybrid rocket engine.

Using a Acrynotrile Butadiene Styrene (ABS) thermoplastic fuel or a fuel formulation consisting of a blend of ABS thermoplastic and aluminum powder, the particle size of which can vary from micron to nano scale, the fuel undergoes a phase change from solid to gas vapor along the exposed surface area of the solid fuel grain port wall. The resulting combined fuel vapor and aluminum powder then mixes with the oxidizer to form a fuel/oxidizer mixture suitable for rocket engine combustion. The resulting combusted reaction mass is expelled at high temperature and pressure through the rocket engine's nozzle (conventional de Laval or aerospike) at a supersonic speed to generate thrust. Generally, hybrid rocket engines using fuel grains consistent with the present invention fabricated from formulations with a ratio in a range from about 75% ABS/20% aluminum will operate with an Isp (vacuum) ranging from about 290 to 300 seconds, while a formulation using as little as 5% nanocomposite aluminum and 95% ABS will operate with an Isp (vacuum) of about 320 seconds or higher.

DETAILED DESCRIPTION OF THE INVENTION

The present invention is a solid fuel grain for a hybrid rocket engine. The solid fuel grain can be manufactured 65 using a fused deposition type additive manufacturing apparatus as described and claimed in the commonly-owned application Ser. No. 15/818,381 and the issued U.S. Pat. Nos. 9,453,479 and 9,822,045, as referenced above.

Figure 1:
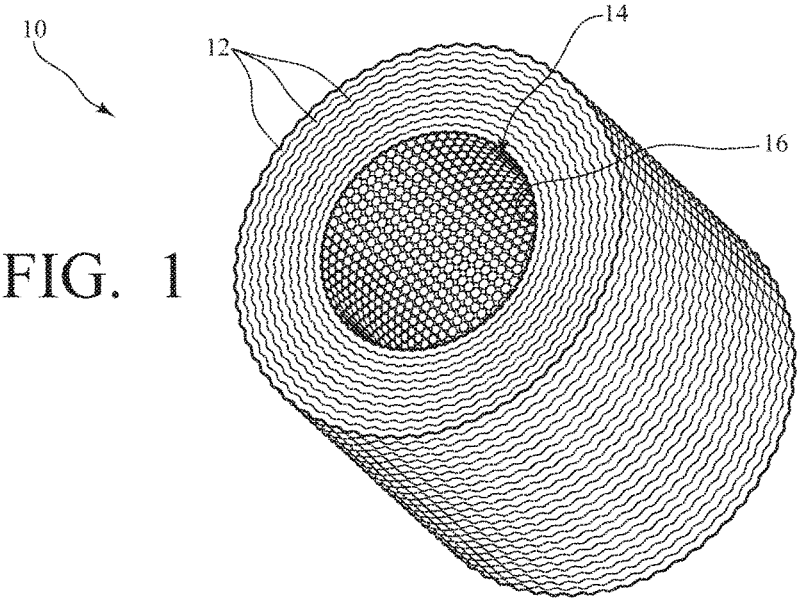
FIG. 1 is a perspective view of a solid fuel grain section made in accordance with the present invention.
Figure 2:
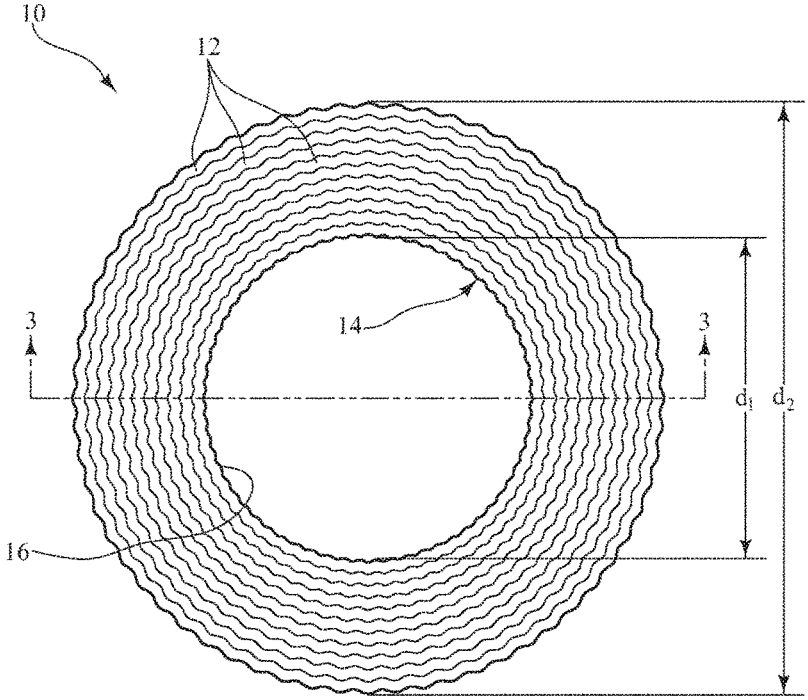
FIG. 2 is a top view of the solid fuel grain section of FIG. 1.
Figure 3:
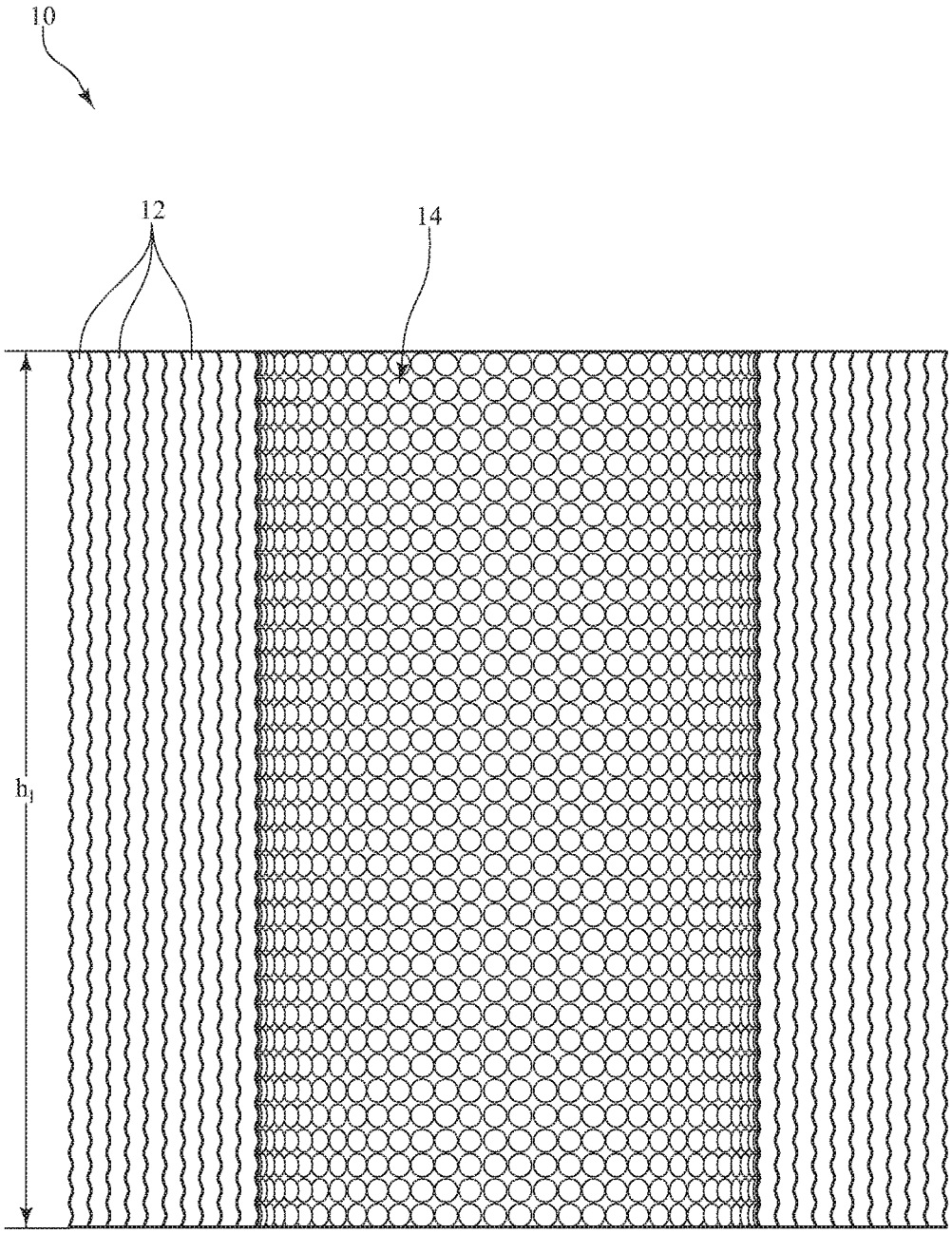
FIG. 3 is a sectional view of the grain section of FIG. 1, taken along line 3-3 of FIG. 2.

FIGS. 1-3 illustrate various views of an exemplary solid fuel grain section 10 suitable for use in a hybrid rocket engine. Additional details of fuel grains, including their fabrication, are described and claimed in one or more of the following commonly-owned and related applications, the contents of which are hereby incorporated by reference:

U.S. Pat. No. 9,453,479 issued on Sep. 27, 2016

U.S. Pat. No. 9,822,045 issued on Nov. 21, 2017 patent application Ser. No. 15/818,381 filed on Nov. 20, 2017 patent application Ser. No. 15/262,661 filed on Sep. 12, 2016

With reference to FIGS. 1-3, the fuel grain section 10 has a generally cylindrical shape and defines a center port 16. In this exemplary embodiment, the center port 16 has a substantially circular cross-section, but the center port 16 could have other geometries, such as a star, clover leaf, or polygon without departing from the spirit or scope of the present invention.

The solid fuel grain section 10 is formed as a fusion (bonded) stack of layers with each such layer formed as a series of abutting fused concentric ring-shaped beads of solidified material 12 arrayed around the center port 16. In one embodiment, a heat gun with an ABS stick is used to bond the individual layers. Viscous ABS is applied to the sectional end caps before aligning and joining the grain sections. As is known by those skilled in the art, other adhesives can be used to join the grain sections.

As is further described below, when incorporated into a hybrid rocket engine, an oxidizer is introduced into the solid fuel grain section 10 along a pathway defined by the center port 16, with combustion occurring along the exposed surfaces (also referred to as the boundary wall or combustion port wall) of the solid fuel grain section 10 port wall. Accordingly, each concentric ring-shaped structure possesses a geometric pattern 14 that serves to increase the surface area for combustion, compared to a smooth concentric circular structure or smooth walls as consistent with cast-molded constructions. As each such concentric ring-shaped bead ablates or undergoes phase change from either solid to gas or solid to entrained liquid droplet, the abutting concentric bead is exposed to the flame sheet. This process continues and persists during the hybrid rocket engine's operation until either oxidizer flow is terminated or the solid fuel is exhausted. Unlike prior art constructions that improve regression rate by increasing the surface area exposed to the flame sheet using a multi-port architecture at the sacrifice of fuel loading, the solid fuel grain of the present invention presents increased surface area as a means to improve regression rate, but without the disadvantages associated with multi-port configurations.

Although the fuel grain section 10 may be manufactured in various sizes or dimensions, in an exemplary embodiment, the fuel grain section 10 has an outer diameter, d2, of 19.0 inches. Although a wide range of diameters and fuel grain lengths (or sectional lengths) are possible, the center port 16 has an initial diameter, d1, (i.e., before combustion) of 4.0 inches in this exemplary embodiment (although a larger diameter is shown in FIG. 3 to enable a better view of the interior of the fuel grain section 10). Although a fuel grain with any grain diameter can be fabricated, traditionally a ratio of about 5:1 (outer diameter to inner diameter) is used for a hybrid rocket fuel grain.

Each of the stacked fused layers in this exemplary embodiment would have an approximate thickness ranging from 0.005 inches to 0.015 inches depending upon the fabrication technique employed.

In one fabrication technique, each of the stacked layers 12 is formed by the deposition of viscous polymer which is extruded following a roughly circular tool path forming a plurality of solidified abutting ring-shaped beads of material. Viewed in cross section as depicted in FIG. 11, each ring-shaped bead of solidified material 90 is oval or elliptical in cross sectional shape, which flattens on its bottom under its own weight as the material cools and flattens on the top as the weight of the next extruded layer of abutting ring-shaped beads of material is deposed above it.

As for the concentric ring-shaped beaded structures, the objective is to increase the surface area presented to the flame zone for combustion within the center port 16 in a manner that is persistent throughout the hybrid rocket engine operation. In this exemplary embodiment, and as illustrated in FIGS. 1-3, the surface pattern presented to the flame zone is characterized by a series of projections and depressions (according to other embodiments the surface pattern comprises a plurality of ribs, a plurality of undulations, a plurality of protrusions and recesses) extending radially into the center port and in this case forming elongated undulations that extend axially through the center port. These undulations are present in each concentric circular ring-shaped beaded structure such that as one ring-shaped beaded structure is ablated, the next-presented ring-shaped structure is revealed, presenting the same geometric pattern, but with an increased radius.

Figure 10:
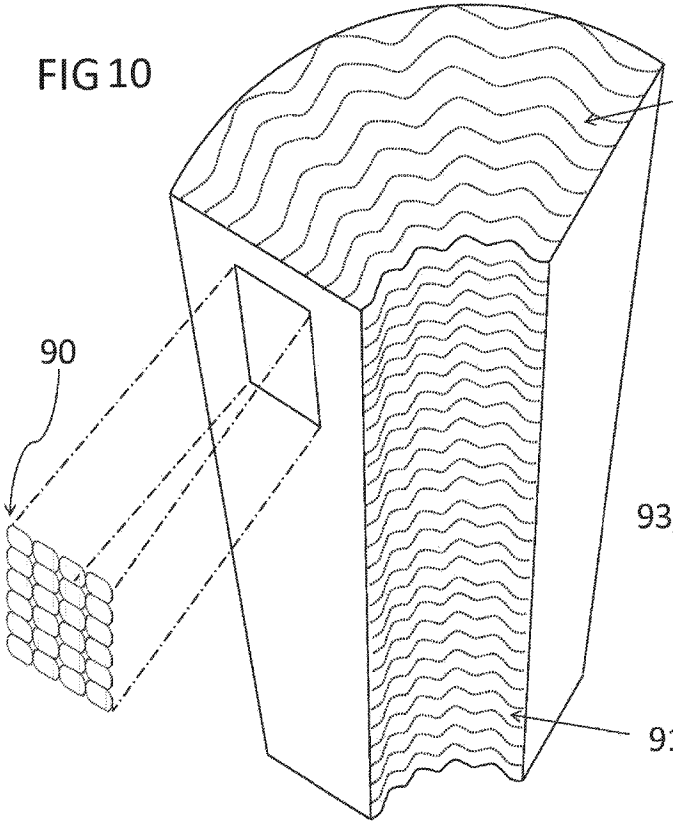
FIG. 10 depicts a quarter sectional view of the fuel grain section of FIG. 1 featuring a concentric corrugation topology grain pattern.
Figure 11:
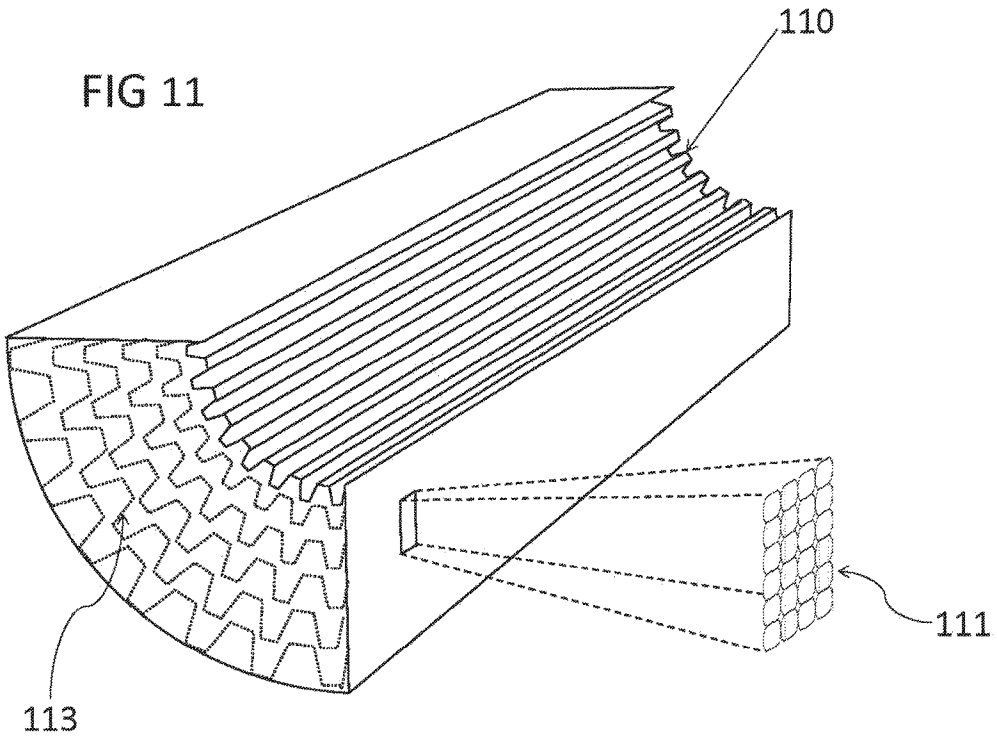
FIGS. 11 and 12 depict quarter sectional views of a fuel grain section featuring a concentric rifled truncated pyramidal topology grain pattern.
Figure 12:
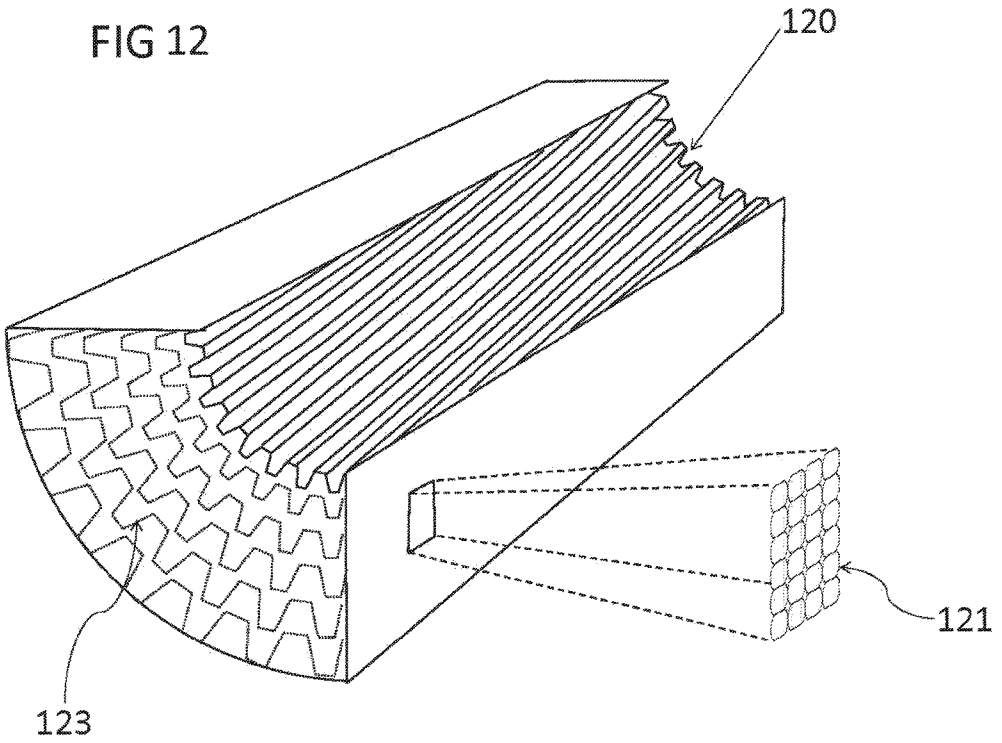
Figures 13A, 13B:
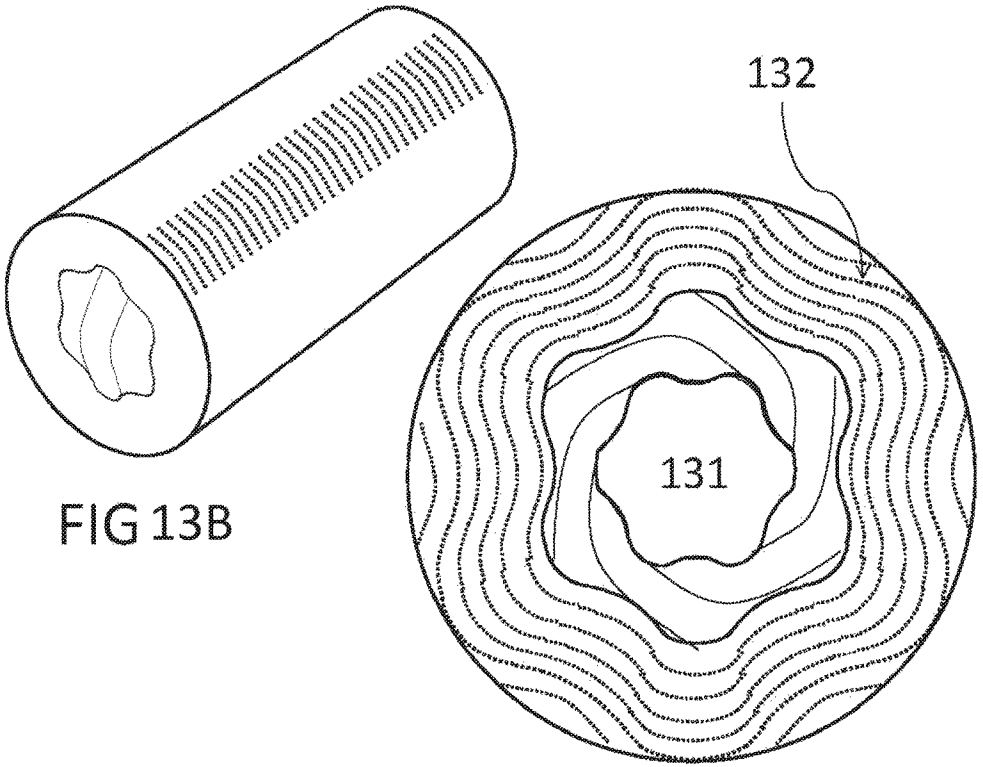
FIGS. 13A and 13B depict a top view and a perspective view of the fuel grain section of FIG. 1 featuring a concentric rifled polygonal topology grain pattern.

In FIGS. 1-3 as well as in FIGS. 10-13B, the individual undulations are identifiable and have a substantially cylindrical shape. However, in practice, depending upon the scale and layer thickness, such internal topology can take the form of a dimple pattern 14 as shown in FIGS. 1-3, a corrugation pattern 92 as shown in FIG. 10, a truncated pyramidal pattern 110 as shown in FIG. 11, a truncated pyramidal pattern 120 as shown in FIG. 12, and an irregular pattern 131 as shown in FIGS. 13A and 13B, all of which may or may not be perceptible to a viewer's unaided eye. Alternatively, the geometric pattern 14, 92, 110, 120, 131 of each ring-shaped concentric beaded structure may take other forms (e.g., an irregular surface) in order to achieve the objective of increasing the surface area available for combustion and to ensure that increased surface area persists throughout operation of the hybrid rocket engine. Any surface features that create the irregular surface and increase the surface area of the combustion port (also referred to as the port wall or the flame wall) are considered within the scope of the present invention.

In one exemplary embodiment, each fused stacked layer is formed from a series of fused concentric ring-shaped beads of solidified material featuring a pattern designed to increase surface area of the boundary wall or flame wall, as compared to a smooth construction, and to present grooved, protrusion, or contoured patterns. In one embodiment the center port wall (also referred to as the boundary wall or flame wall) features a rifling pattern designed to induce oxidizer vortex flow persisting throughout the hybrid rocket engine's operation as the fuel is consumed.

In addition to the fused deposition techniques of additive fabrication, as referred to in the cited commonly-owned patent references, there are a number of other additive manufacturing methods that can be employed to produce hybrid rocket fuel grains according to the present invention and using a formulation of polymer and nanocomposite aluminum additive, without departing from the spirit and scope of the present invention, including: Stereolithography, Selective Laser Sintering, Powder Bed Printing, and Inkjet Head Printing.

For the examples shown in the various Figures described herein, a composition of the fuel grain is about 95% by mass Acrylonitrile Butadiene Styrene (ABS), a thermoplastic possessing combustion characteristics desirable for hybrid rocket engine fuel, and about 5% nanocomposite aluminum. Fuel having this structure is available from several sources, as known by those skilled in the art.

With a Young's Modulus of 2.0-2.6 GPa, ABS is 460 times less elastic than HTPB and 38 times less elastic than paraffin wax, making it an ideal material for fabricating a hybrid rocket fuel grain and its combustion chamber center port.

Ultra-high energetic nano-particle sized aluminum, especially aluminum powder produced without an aluminum oxide shell and passivated (by encapsulating or 'capping' the particle in a polymer shell) for safe handling and use, increases the fuel grain burning rate by as much as 50% using only a 5% concentration, compared to a fuel grain fabricated in ABS with a 25% concentration of standard military grade 44-micron particle size aluminum.

Figure 4A:
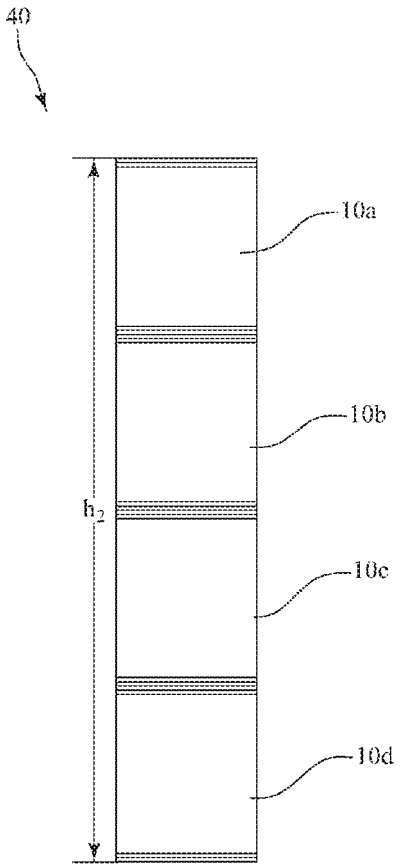
FIG. 4A is a side view of a solid fuel grain comprised of a plurality of solid fuel grain sections.
Figure 4B:
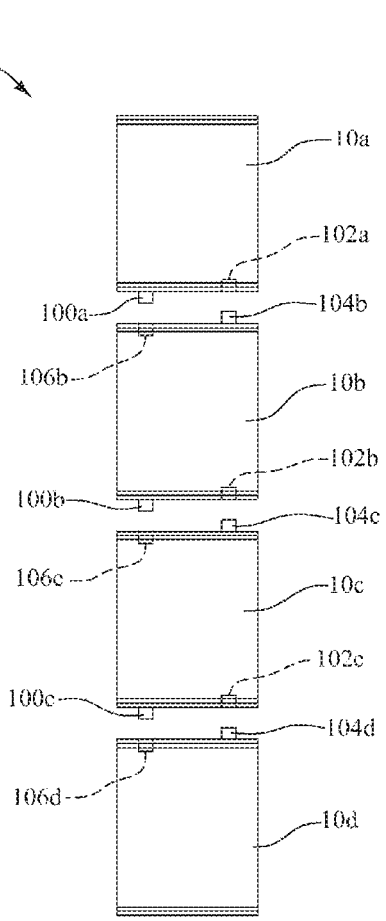
FIG. 4B is an exploded side view of the solid fuel grain of FIG. 5A.

Referring now to FIGS. 4A-4B, the individual fuel grain sections 10a, 10b, 10c, and 10d can be assembled and joined together from multiple separately fabricated sections to form a complete solid fuel grain 40. In this exemplary embodiment, each solid fuel grain section 10 has a height, h1, of 23 inches, such that the overall height, h2, of the complete solid fuel grain 40 is 92 inches. Furthermore, in this exemplary embodiment, to ensure proper alignment, the topmost solid fuel grain 10a has at least one connecting member 100a extending from its lower surface and at least one cavity 102a defined in its lower surface for receiving a mating connecting member 104b. Similarly, the intermediate solid fuel grain sections 10b, 10c, each have at least one connecting member 100b and 100c, extending from their respective lower surfaces and one connecting member 104b, 104c, extending from their respective upper surfaces, and further each have at least one cavity 102b, 102c defined in their respective lower surfaces and at least one cavity 106b, 106c defined in their respective upper surfaces. Finally, the lowermost solid fuel grain section 10d has at least one connecting member 104b extending from its upper surface and at least one cavity 106d defined in its upper surface for receiving a mating connecting member 100c in the fuel grain section 10c.

Accordingly, when heated above its glass transition temperature but below the aluminum powder's ignition temperature, viscous ABS can be spread or sprayed on the upper and lower surfaces to create a strong fusion bond between the sections 10a, 10b, 10c, 10d during assembly. In this way, solid fuel grain sections 10a, 10b, 10c, 10d can be readily stacked, aligned, and mated to one another to form the complete solid fuel grain 40.

Figure 5:
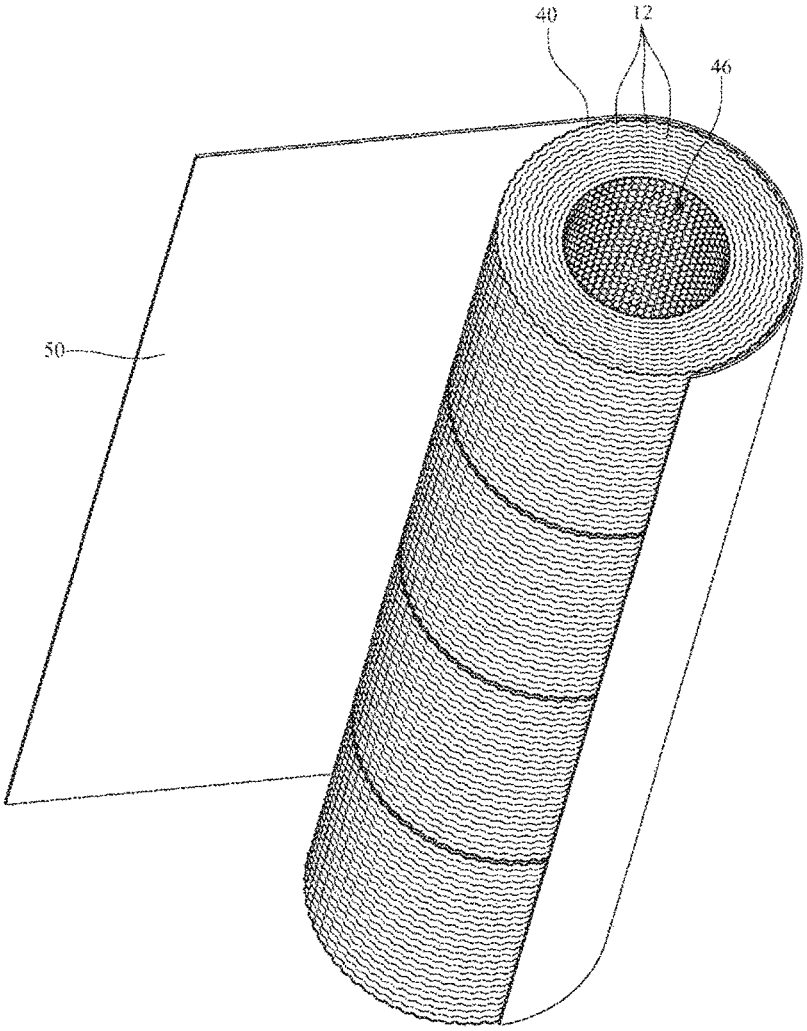
FIG. 5 is a perspective view of the plurality of solid fuel grain sections of FIG. 45A wrapped with insulating film.

Referring now to FIG. 5, after the solid fuel grain sections 10a, 10b, 10c, 10d are assembled, the solid fuel grain sections 10a, 10b, 10c, 10d collectively define a center port 46 through the solid fuel grain 40. The solid fuel grain 40 is preferably wrapped in a film 50 made of phenol or other suitable thermally resistant material. Placed between the inner wall of a fuel motor case (not shown in FIG. 6) and the outer surface of the solid fuel grain, the film 50 acts as an insulation layer to reflect heat and prevent damage to fuel motor cases made from either metal or non-metallic materials such as carbon fiber reinforced polymer composite. Once wrapped in the film 50, the solid fuel grain 40 can be placed into a motor case of a rocket.

Figure 6:
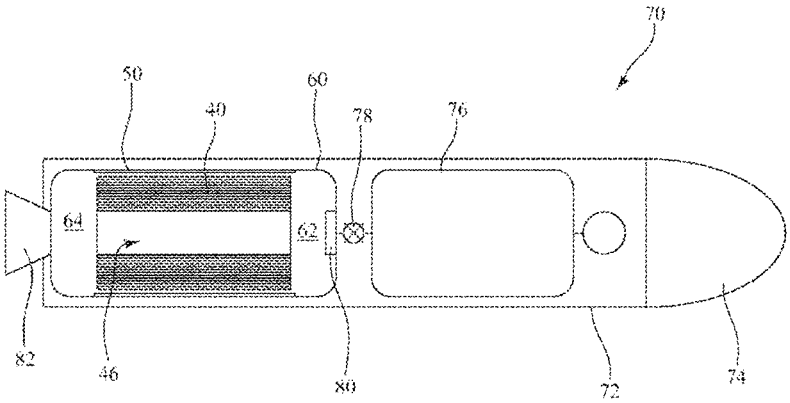
FIG. 6 is a sectional view of an exemplary rocket incorporating the solid fuel grain of FIGS. 4A, 4B, and 5.

FIG. 6 is a sectional view of an exemplary hybrid rocket engine 70 housed within an aeroshell 72 to form a complete hybrid rocket powered vehicle 70 incorporating the solid fuel grain 40 as described above with respect to FIGS. 4A, 4B, and 5. The exemplary hybrid rocket powered vehicle 70 generally comprises an aeroshell body 72, a nozzle 82 at one distal end of said aeroshell body 72, and a payload section 74 at an opposite distal end of said aeroshell body 72. Enclosed within the aero shell body 72 of the hybrid rocket powered vehicle 70 is a hybrid rocket engine including an oxidizer tank 76, a valve 78, a motor case 60, and an oxidizer injector 80 housed typically within a forward cap (not shown) that also houses the ignition system (not shown). The motor case 60 houses a pre-combustion chamber (not shown), a post-combustion chamber 64, and the solid fuel grain 40, which as described above is wrapped in insulating film 50.

The solid fuel grain 40 wrapped in a thermal insulating film 50 can be "cartridge loaded" into the motor case 60 of the hybrid rocket engine. Alternatively, the exemplary solid fuel grain 40 wrapped in thermal insulating film 50 could be wound with a fiber-reinforced polymer composite to form the motor case without departing from the spirit and scope of the present invention. In another exemplary embodiment, the solid fuel grain 40 can be inserted into a thermal protection cylinder fabricated from insulating material such as phenolic or cork without departing from the spirit and scope of the present invention. In yet another exemplary embodiment, the fuel grain 40 can be formed to embody either or both the pre-combustion chamber and the post-combustion chamber 64 without departing from the spirit and scope of the present invention.

Figure 7:
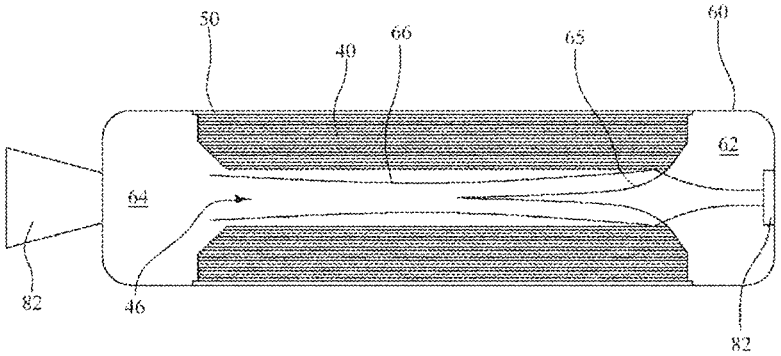
FIG. 7 is an enlarged sectional view of the motor case of the rocket of FIG. 6, showing a flame configuration.

FIG. 7 is an enlarged sectional view of the motor case 60 of the hybrid rocket powered vehicle 70 of FIG. 6, showing the flame zone within the fuel grain center port 46. As shown, an oxidizer 94 (either a liquid or a gas) is injected into the motor case 60 along a pathway defined by the center port 46 of the solid fuel grain 40 and flows within the center port 46, forming a boundary layer 65 bordered by the center port 46 wall. The boundary layer 65 is usually turbulent throughout a large portion of the length of the center port 46. Within the boundary layer 65 is a turbulent diffusion flame zone 66 that extends throughout the entire length of the center port 46 and depending upon the characteristics of the solid fuel selected, either causing a phase change to a gas or entrained liquid droplets of fuel to form. Evaporation from the oxidizer/fuel gas/entrained liquid droplet interface produces a continuous flow of fuel gas that mixes with oxidizer gas at the flame zone 66 to maintain combustion along the exposed surface area of the center port 46 wall. At steady state, the regression rate of the melt surface and the gas-gas or gas-entrained liquid droplet interface is the same, and the thickness of the gaseous or entrained liquid layer is constant.

Because the port wall surface pattern 14, 91, 110, 120, 131 exposed to the flame zone 66 possesses increased surface area compared to cast-molded constructions, the exemplary solid fuel grain 40 causes increased regression rate and corresponding increased thrust impulse without the decreased fuel volumes associated with multi-port designs. Additionally, the undulating wall surface pattern that runs the length of the fuel grain port also causes the mixture of fuel gas (or entrained fuel droplets) and atomized or gaseous oxidizer to continually trip, creating a consistent circular eddy current flow which contributes to more thorough combustion and a higher Isp.

The continual trip referred to above is a mechanism of motion of oxidizer and fuel gas through the port. Due to the rough, semi-circular ribbed pattern along the port wall (as described elsewhere herein), the oxidizer/fuel gas mixture, as it flows along the boundary with the port wall, will "trip" over the ribs, and create an eddy current. This tripping mechanism causes the port wall to regress more rapidly, requiring a longer time for the fuel gas mixture to clear the port into the nozzle; thus contributing to improved combustion and less propellant waste. This mechanism, together with the much higher surface area that is created by a ribbed pattern, results in a significantly higher than typical regression rate as well as higher specific impulse that obtained with prior art designs.

Figure 8A:
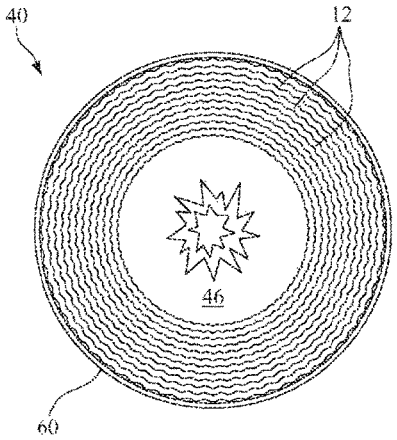
FIGS. 8A, 8B, and 8C are top views of the fuel grain section of FIG. 1 as successively consumed by a flame.
Figure 8B:
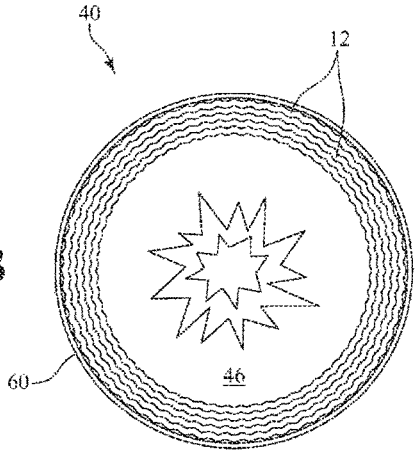
Figure 8C:
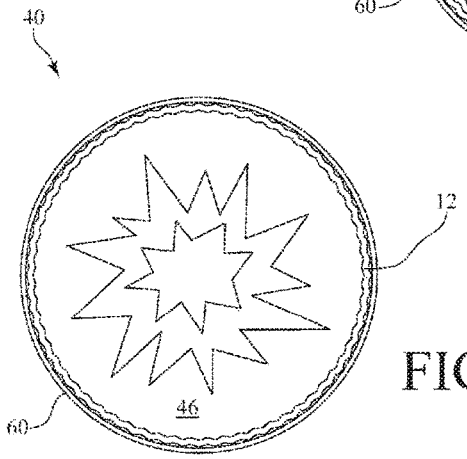

Also, unlike the prior art constructions that increase the surface area using a multi-port architecture (which sacrifices fuel loading), the solid fuel grain 40 of the present invention allows a smooth burning process whereby, as each concentric ring-shaped beaded structure forming each layer of the fusion stacked layer center port 46 wall is ablated, a new concentric ring-shaped beaded structure, the plurality of which forms the expanded center port 46 wall, is presented to the flame zone 66, as shown in FIGS. 8A-8C, illustrating ablation of the center port wall at three different stages. This burning process continues until either oxidizer flow is terminated or the solid fuel grain 40 material is exhausted.

Generally, energetic materials suitable for use in the present invention are a class of material with high amount of stored chemical energy that can be released. Highly energetic materials include ultrafine aluminum powder, the particle size of which can vary from micron to nanoscale, including particles that are a composite of aluminum and polymer in nanoscale. As known by those skilled in the art, generally a nanocomposite is a material comprising two or more constituent solids, the size of which measures 100 nanometers (nm) or less. Even though the nano-scale aluminum particle cores are completely encapsulated in a polymer based oligomer coating and thus passivated, there remains the possibility that this highly energetic pyrophoric material can still be reactive with oxygen or water vapor. As a safety precaution, the nanocomposite aluminum, the ABS thermoplastic, and the compounded ABS-nanocomposite materials are stored in containers designed to store flammable material, preferably infilled with a non-reactive noble gas at all times prior to their use as feedstock in an additive manufacturing process.

In one application, the compounded material is stored within a climate controlled environment.

As a further safety measure, after fabrication each fuel grain or fuel grain section is shrink-wrapped to encase the fuel grain or fuel grain section in a thin plastic film to prevent atmospheric exposure prior to its use in a hybrid rocket engine. In another embodiment the fuel grain is spray coated with a polymeric material or paint that serves to prevent atmospheric exposure. According to another embodiment the fuel grain or grain segment is inserted into an air-tight packaging cylinder and a vacuum drawn to remove all air. The packaging cylinder is sealed before it is removed from the print bed chamber.

Figure 9:
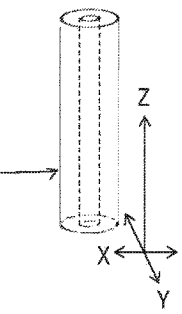
FIG. 9 depicts the coordinate system and orientation of the fuel grain for use with FIGS. 10-13.

FIG. 9 depicts the coordinate system and orientation of the fuel grain for use with FIGS. 10-13B FIG. 10 is a quarter sectional view of the fuel grain section of FIG. 1 featuring a concentric ring-shaped corrugation build pattern or fuel grain 92, a port wall surface pattern 91, and several layers of fused concentric beads in cross section 90.

FIG. 11 is a quarter sectional view of the fuel grain section of FIG. 1 featuring a concentric ring-shaped truncated pyramidal build pattern or fuel grain 113, a port wall surface pattern 110, and several layers of fused concentric beads in cross section 111.

FIG. 12 is a quarter sectional view of the fuel grain section of FIG. 1 featuring a concentric ring-shaped rifled truncated pyramidal build pattern or fuel grain 123, a port wall surface pattern 120 with the build and surface patterns staggered layer by layer to form in its plurality a persistent rifling pattern.

FIG. 13A depicts a top view and FIG. 13B a perspective view showing the port wall surface pattern 131 of the fuel grain section of FIG. 1. FIGS. 13A and 13B feature a concentric ring-shaped rifled polygonal pattern for fuel grain 132 with each such polygonal build pattern staggered and twisted (i.e., rifled) layer-by-layer to form in its plurality a persistent rifling pattern.

The embodiments of FIGS. 12 and 13A/13B present a persistent rifling pattern to the oxidizer flowing through the center port 46 to induce axial flow.

The embodiments of FIGS. 11-13B depict exemplary constructions of a hybrid rocket fuel grain engineered to both increase the amount of surface area available for combustion as a means to improve regression rate, to improve specific impulse, to generate an oxidizer vortex flow, and to reduce fuel waste by inducing oxidizer axial flow within the center port 46 (see FIG. 7) to allow more time for oxidizer and fuel gases (or oxidizer and entrained liquid droplets) to mix and combust more thoroughly. Any surface area pattern or topology that furthers one or more of these objectives, and is sustainable throughout the fuel grain cross-section (i.e., as one fuel grain layer ablates the next fuel gran layer presents a desirable surface area pattern) is considered within the scope of the present invention.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A fuel grain for a hybrid rocket, the fuel grain comprising:

a plurality of layers of fuel grain material, each layer comprising a plurality of concentric ring-shaped beaded structures of different radii fused together to form a disc defining a central opening therein;

the plurality of layers stacked and bonded to form a cylindrical fuel grain with the central opening of each one of the plurality of layers aligned to form a combustion port extending axially through the fuel grain and bounded by a boundary wall;

wherein the fuel grain material comprises a combustible substance; and an inner circumferential surface of each ring-shaped beaded structure comprising an irregular surface, such that as a ring-shaped bead forming the boundary wall ablates due to combustion in the combustion port, an inner circumferential wall of an adjacent ring-shaped bead comprising an irregular surface presents to form the boundary wall.

2. The fuel grain of claim 1 wherein the irregular surface of the boundary wall provides a larger surface area and an increased regression rate of the fuel grain relative to a fuel grain lacking an irregular surface while simultaneously inducing oxidizer/fuel gas flowing through the combustion port to continually trip, thereby creating a consistent eddy current and enabling improved combustion and higher Isp.

3. The fuel grain of claim 1 wherein the plurality of layers of fuel grain material comprises an inner layer forming the boundary wall prior to combustion in the combustion port, an outer layer forming an outer layer of the fuel grain, and a plurality of intermediate layers disposed therebetween, wherein progressing from the inner layer to the outer layer an irregularity in the irregular surface is less pronounced.

4. The fuel grain of claim 1 wherein the irregular surface comprises projections configured to form a progressive axial twist through the combustion port, the axial twist for inducing a swirling gaseous flow within the combustion port.

5. The fuel grain of claim 4 wherein the progressive axial twist comprises a helical grooved rifling pattern of projections.

6. The fuel grain of claim 1 wherein the progressive axial twist comprises a polygonal rifling geometry.

7. The fuel grain of claim 1 produced by an additive manufacturing process.

8. The fuel grain of claim 1 wherein the grain material comprises Acrylonitrile Butadiene Styrene (ABS) thermoplastic and a plurality of micron scale or nanoscale elemental aluminum particles or a plurality of nanoscale elemental aluminum core particles capped with an oligomer polymer.

9. The fuel grain of claim 1 wherein the grain material comprises Acrylonitrile Butadiene Styrene (ABS) thermoplastic by mass ranging from 80% to 95% and aluminum powder by mass correspondingly ranging from 20% to 5%, the particle size of which can vary from 15 nanometers to 44 microns.

10. The fuel grain of claim 1 further comprising a thermally insulating material encasing the fuel grain.

11. The fuel grain of claim 1 the irregular surface comprising one or more of a plurality of ribs, a plurality of undulations, a plurality of protrusions and recesses, a plurality of depressions.

12. The fuel grain of claim 1 the irregular surface comprising one or more of a corrugation pattern, a truncated pyramidal pattern, a rifled truncated pyramidal pattern, or a rifled polygonal pattern.

13. The fuel grain of claim 1 wherein a shape of the combustion port comprises a circular shape, an oval shape, an elliptical shape, a polygonal shape, a quatrefoil shape, a star shape, or an irregular shape.

14. The fuel grain of claim 1 wherein the fuel grain defines an outer diameter of 19.0 inches and the combustion port has an initial diameter of 4 inches prior to consumption of fuel grain material during combustion.

15. A plurality of fuel grain segments each according to claim 1 further comprising ABS material between a surface of a first fuel grain segment and an abutting surface of a second fuel grain segment thereby creating a fusion bond between the first and second fuel grain segments.

16. The fuel grain of claim 1 wherein a composition of the fuel grain material of each one of the concentric ring-shaped beaded structures is substantially uniform.

17. The fuel grain of claim 1 wherein the combustible substance comprises a formulation of thermoplastic and passivated nanoscale metallic material.

18. The fuel grain of claim 1 wherein the irregular surface of each ring-shaped beaded structure comprises a sustaining internal topological pattern as each ring-shaped beaded structure ablates and another ring-shaped beaded structure is revealed due to combustion and ablation to the combustion port wall.

19. The fuel grain of claim 1, wherein the irregular surface of each ring-shaped beaded structures forms a sustaining rifling pattern or geometry for both increasing the surface area of the combustion port wall and for generating a vortex flow of oxidizer and fuel gas flowing through the combustion port.

20. The fuel grain of claim 1 wherein a material of each ring-shaped beaded structure comprises a solidified material, further comprising a polymer or a solidified polymer-metal blend formulation suitable for combusting in a hybrid rocket engine.

21. The fuel grain of claim 1 wherein a material of each ring-shaped beaded structure comprises a blend of Acrylonitrile Butadiene Styrene (ABS) and aluminum powder.

22. The fuel grain of claim 1 wherein the combustion port defines a polygonal shape in a cross section with an orientation of each layer adjusted to create a progressive helical twist axially through the combustion port, forming a rifling pattern to induce a swirling oxidizer/fuel gaseous flow within the center combustion port.

23. A fuel grain for a hybrid rocket, the fuel grain comprising:

a first fuel grain section comprising:

a first plurality of concentric ring-shaped beads of different radii fused together to form a first disc, the first disc defining a first combustion port;

an inner circumferential surface of each of the first plurality of circular ring-shaped beads comprising an irregular surface, such that as a ring-shaped bead forming a first combustion port wall ablates due to combustion in a combustion port, an inner circumferential surface of an adjacent ring-shaped bead comprising an irregular surface presents to form the first combustion port wall;

a material of the first fuel grain section comprising a combustible substance;

a second fuel grain section comprising:

a second plurality of concentric ring-shaped beads of different radii fused together to form a second disc, the second disc defining a second combustion port;

an inner circumferential surface of each of the second plurality of circular ring-shaped beads comprising an irregular surface, such that as a ring-shaped bead forming a second combustion port ablates due to combustion in a combustion port, an inner circumferential wall of an adjacent ring-shaped bead comprising an irregular surface presents to form the second combustion port wall;

a material of the second fuel grain section comprising a combustible substance; and the first and second fuel grain sections bonded together and the first and second combustion ports aligned to form the fuel grain.

24. The fuel grain of claim 23 further comprising a first connecting member in a lower surface of the first fuel grain section for mating with a second connecting member in an upper surface of the second fuel grain section.

25. A hybrid rocket engine comprising:

a fuel grain further comprising:

a plurality of layers of fuel grain material each layer comprising a plurality of concentric ring-shaped beaded structures of different radii fused together to form a disc, the disc defining a central opening;

the plurality of layers stacked and bonded to form a cylindrical fuel grain such that the central opening of each one of the plurality of layers is aligned to form a combustion port extending axially through the fuel grain and bounded by a boundary wall;

wherein the fuel grain material includes at least one combustible substance;

an inner circumferential surface of each ring-shaped beaded structure comprising an irregular surface, such that as a ring-shaped bead forming the boundary wall ablates due to combustion in the combustion port, an inner circumferential wall of an adjacent ring-shaped bead comprising an irregular surface presents to form the boundary wall;

an oxidizer source, the oxidizer for flowing through the combustion port during engine operation;

a valve for controlling flow of oxidizer through the combustion port;

a nozzle in fluid communication with the combustion port; and a shell for housing the fuel grain, the oxidizer source, and the valve, the nozzle extending from the shell.

26. The hybrid rocket engine of claim 25 further comprising an insulating film surrounding the fuel grain.

*27. A fuel grain for a hybrid rocket, the fuel grain comprising:*

*multiple beads of fuel grain material, in which the beads are fused together to form a generally cylindrical fuel grain defining a combustion port extending axially through the generally cylindrical fuel grain, in which the combustion port is bounded by a boundary wall,*

*in which the fuel grain material comprises a combustible substance, and*

*in which the boundary wall is formed of a subset of the beads of combustible fuel grain material, and in which the boundary wall is configured to induce an eddy current in a fluid flowing through the combustion port.*

*28. The fuel grain of claim 27, in which the fuel grain is configured such that when the boundary wall ablates due to combustion in the combustion port, a new surface of fuel grain material is exposed to the combustion port.*

*29. The fuel grain of claim 27, in which the boundary wall presents a larger surface area to the combustion port relative to a boundary wall that is not formed of beads of fuel grain material.*

*30. The fuel grain of claim 27, in which the boundary wall is textured with one or more of ribs, dimples, undulations, protrusions, or depressions.*

*31. The fuel grain of claim 27, in which when viewed along a longitudinal axis of the combustion port, the boundary wall defines alternating protrusions and depressions.*

*32. The fuel grain of claim 27, in which the fuel grain is fabricated in an additive manufacturing process.*

*33. The fuel grain of claim 27, in which the fuel grain material comprises an Acrylonitrile Butadiene Styrene (ABS) thermoplastic.*

*34. The fuel grain of claim 27, in which the fuel grain material comprises a mixture of a hybrid rocket fuel material and a nanoscale metallic material.*

*35. The fuel grain of claim 34, in which the fuel grain material comprises between 80% and 95% by mass of the hybrid rocket fuel material and between 5% and 20% by mass of the nanoscale metallic material.*

*36. The fuel grain of claim 27, comprising a thermally insulating material encasing the fuel grain.*

*37. A fuel grain assembly comprising:*

*multiple of the fuel grains of claim 28,*

*in which an end of fuel grain is bonded to an end of an adjacent fuel grain to form an elongated, generally cylindrical fuel grain assembly, and*

*in which the combustion ports of the multiple fuel grains are aligned to define an elongated combustion port of the fuel grain assembly.*

*38. A hybrid rocket engine comprising:*

*the fuel grain of claim 28;*

*an oxidizer source configured to provide a flow of an oxidizer through the combustion port during operation of the hybrid rocket engine;*

*a valve configured to control the flow of the oxidizer through the combustion port;*

*a nozzle in fluid communication with the combustion port; and*

*a casing, in which the fuel grain, the oxidizer source, and the valve are housed within the casing, and in which the nozzle extends beyond an end of the casing.*

*39. A fuel grain for a hybrid rocket, the fuel grain comprising:*

*a generally cylindrical body formed of a fuel grain material comprising a combustible substance, in which a combustion port extends axially through the body, in which the combustion port is bounded by a boundary wall,*

*in which the boundary wall is formed of the fuel grain material, and in which the boundary wall is configured to induce an eddy current in the combustion port in a fluid flowing through the combustion port, and*

*in which the fuel grain is configured such that when the boundary wall ablates due to combustion in the combustion port, a new surface of fuel grain material is exposed to the combustion port.*

*40. The fuel grain of claim 39, in which the body comprises beads of the fuel grain material, in which the beads are fused together to form the body.*

*41. The fuel grain of claim 39, in which the boundary wall is textured with one or more of ribs, dimples, undulations, protrusions, or depressions.*

*42. The fuel grain of claim 41, in which the boundary wall presents a larger surface area to the combustion port relative to a boundary wall that is not textured.*

*43. The fuel grain of claim 39, in which when viewed along a longitudinal axis of the combustion port, the boundary wall defines alternating protrusions and depressions.*

*44. The fuel grain of claim 39, in which the fuel grain is fabricated in an additive manufacturing process.*

*45. The fuel grain of claim 39, in which the fuel grain material comprises an Acrylonitrile Butadiene Styrene (ABS) thermoplastic.*

*46. The fuel grain of claim 39, in which the fuel grain material comprises a mixture of a hybrid rocket fuel material and a nanoscale metallic material.*

*47. The fuel grain of claim 46, in which the fuel grain material comprises between 80% and 95% by mass of the hybrid rocket fuel material and between 5% and 20% by mass of the nanoscale metallic material.*

*48. The fuel grain of claim 39, comprising a thermally insulating material encasing the fuel grain.*

*49. A fuel grain assembly comprising:*

*multiple of the fuel grains of claim 39,*

*in which an end of fuel grain is bonded to an end of an adjacent fuel grain to form an elongated, generally cylindrical fuel grain assembly, and*

*in which the combustion ports of the multiple fuel grains are aligned to define an elongated combustion port of the fuel grain assembly.*

*50. A hybrid rocket engine comprising:*

*the fuel grain of claim 39;*

*an oxidizer source configured to provide a flow of an oxidizer through the combustion port during operation of the hybrid rocket engine;*

*a valve configured to control the flow of the oxidizer through the combustion port;*

*a nozzle in fluid communication with the combustion port; and*

*a casing, in which the fuel grain, the oxidizer source, and the valve are housed within the casing, and in which the nozzle extends beyond an end of the casing.*

* * * * *